Feb. 3, 1959  D. E. GOLAY  2,871,821
MILK LINE VACUUM RELEASER
Filed March 20, 1957
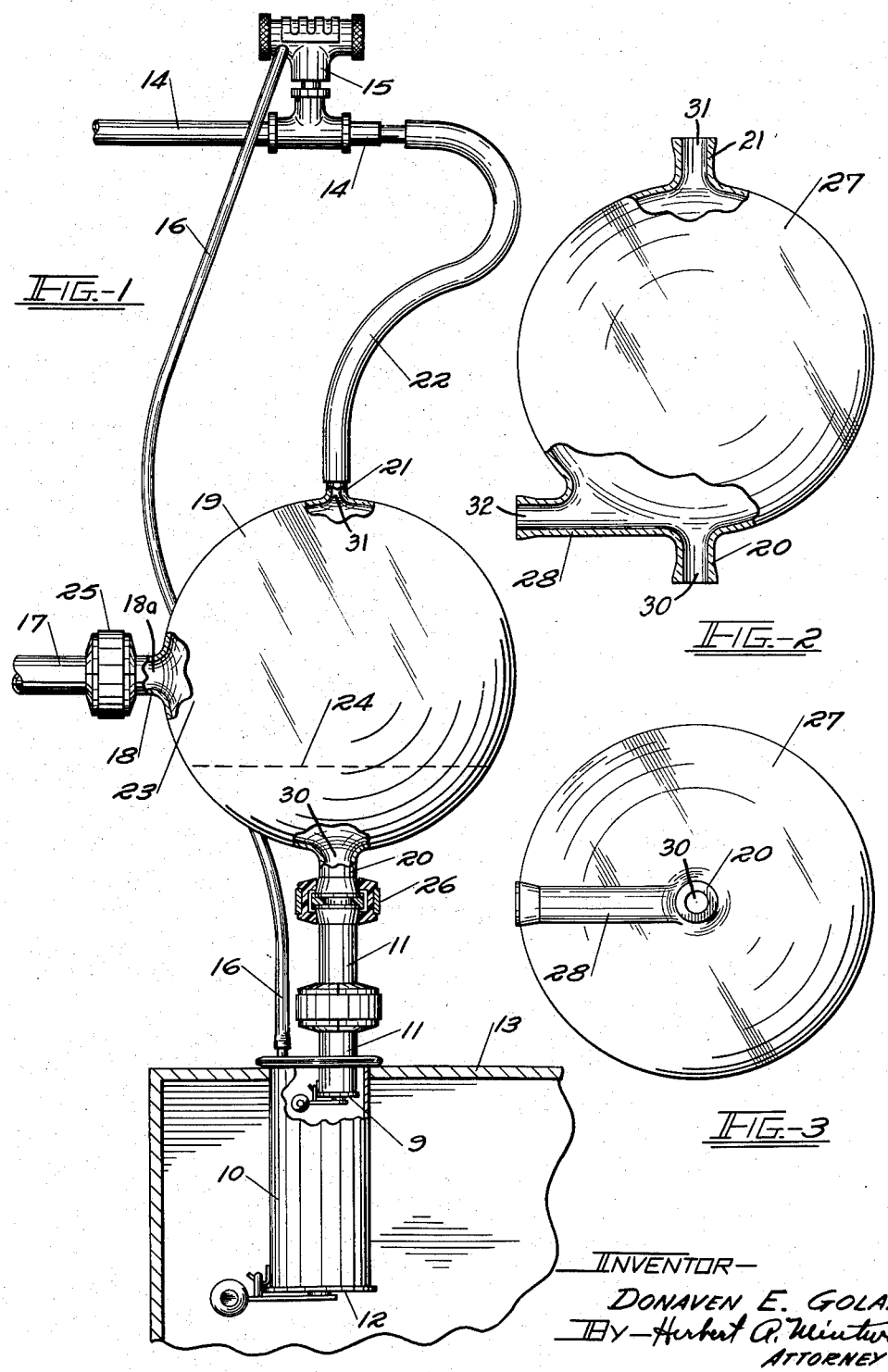
INVENTOR—
DONAVEN E. GOLAY
BY—Herbert A. Minturn
ATTORNEY

2,871,821
MILK LINE VACUUM RELEASER

Donaven E. Golay, Cambridge City, Ind., assignor to Farmer Feeder Company, Inc., Cambridge City, Ind.

Application March 20, 1957, Serial No. 647,346

1 Claim. (Cl. 119—14.07)

This invention relates to a device for insertion between a milk line conveying milk from cows being milked by mechanical milkers to a bulk storage tank wherein milk is held normally under refrigeration prior to being picked up by a collecting truck and taken to a processing plant. The milk line is under a vacuum pressure and in order to maintain the proper degree of vacuum at the milking machine, the vacuum in this milk line should not be varied or fluctuated, otherwise the milking rate and otherwise proper action of the mechanical milker is affected.

Between that milk line and the bulk tank, there must be some device for permitting the milk to flow from the line into the tank in such manner that the milk itself is not unduly splashed or churned in order that the butter fat content of the milk not be reduced, and further that a greasy film or actual butter itself will not be produced in the device between the line and the tank.

The vacuum pressure employed is on the order of around ten inches of water and therefore is considered or termed to be a low degree of vacuum. Therefore any reduction particularly in that vacuum is conducive very quickly to improper milk flow.

Reference is made to my co-pending application for patent, Serial No. 544,491, filed November 2, 1955, and allowed January 30, 1957, particularly to the releaser mechanism described and claimed therein. The present invention employs a releaser of the general construction of that shown and described in said application, and is herein designated by the numeral 10.

The structure is illustrated by the accompanying drawing, in which:

Fig. 1 is a view in vertical elevation and partial section of the structure embodying the invention;

Fig. 2 is a view in vertical elevation and partial section of a modified form of an intermediate release bowl; and Fig. 3 is a bottom plan view of the bowl.

The functioning of this releaser 10 is the same as that described in said application, and in general receives milk through a pipe line 11 into the releaser 10, from which the milk is discharged through a periodically opening and closing valve 12. There is an internal valve 9 operating to intermittently close off the line 11 in the upper part of the releaser 10, not shown in detail in the present drawing for the reason that it does not enter into the invention per se. It is sufficient for the purpose of describing the present invention that the releaser 10 intermittently receives and dumps milk into the milk tank 13.

There is a vacuum line 14 in which a constant vacuum pressure is maintained, and there is a pulsator unit 15 operating in connection with this line 14 to set up an intermittent vacuum pressure and atmospheric pressure in a flexible line 16 which is connected to the releaser 10 to operate that unit, all as again shown and described and claimed in said application.

A milk line 17 flowing from the zone at which a cow or cows may be milked, is detachably interconnected with a nipple 18 protruding horizontally from the side of a glass, spherical bowl 19. This nipple 18 has a passageway 18a extending therethrough and opening into the bowl 19.

A discharge nipple 20 having a passageway 30 therethrough and opening into the bowl 19 extends from the underside of the bowl 19 and is interconnected through the pipe 11 with the releaser 10 to conduct milk from the bowl 19 to the releaser 10.

A third nipple 21 having a passageway 31 therethrough and opening into the bowl 19 extends from the uppermost part of the bowl 19 and to that nipple 21 there is connected a flexible pipe line 22 which extends therefrom to be connected to the vacuum line 14.

The bowl 19 is entirely closed off to the atmosphere, and has only the entering passageways as indicated through the nipples 18, 20, and 21. By means of the line 22 a vacuum pressure is maintained in the bowl 19, in turn maintaining a pressure, vacuum, in the line 17. The pipe line 11 is normally closed by the releaser 10, and is opened intermittently through the vacuum pressure produced in the releaser 10 through the pipe line 16. Gravity of milk within the releaser 10 induces opening of the valve 12 for discharge of the milk therefrom upon a sufficient accumulation of the milk within the releaser.

Milk flowing from the line 17 through the nipple 18 discharges into the bowl 19 by flowing down the spherical wall 23 in a smooth, non-splashing manner to accumulate within the bowl 19 to some such level as indicated by the dash line 24. That is, the milk will vary between that approximate level 24 and down to the nipple 20 as the releaser 10 may receive and discharge milk. It is to be noted that in this smooth, easy flow of the milk from the line 17 into the spherical bowl 19, there is no possibility for the milk to drop downwardly vertically and splash into a pool of milk below such as would be the case where a vertical side wall of a milk receiver is employed as has been the case heretofore. Neither is there any gurgling of the milk upwardly through a body of milk within the bowl 19 as has also been the practice in some instances.

Since the bowl 19 is made out of glass, the level 24 wherever it may be below the nipple 18 is readily observed as a check upon the over-all operation of the device, but more importantly, the bowl 19 may be readily observed in respect to the cleanliness thereof. Sanitation must be had, in order to keep the bacterial count to the lowest possible level, particularly where the milk is to be stored in bulk. The bowl 19 is of course detachable as above indicated, the line 22 being frictionally engaged over the nipple 21, and the lines 17 and 11 being interconnected through the quick detachable unions 25 and 26. Of course the bowl 19 may be washed in place without detaching it from the pipes 11, 17, and 22, although normally the bowl 19 may be washed without such detachment. This is particularly true in view of the fact that there is no splashing of the milk within the bowl 19, to cause droplets of milk to adhere to the upper portion of the bowl 19, and as above indicated, since the splashing and surging of milk within a body thereof is avoided, there is no tendency for butter fat to be separated from the milk as it flows.

As illustrated in Fig. 2, there is a modified form shown of the bowl designated by the numeral 27. This bowl 27 like the bowl 19 is made out of glass. It differs over the bowl 19 in that there is a milk inlet nipple 28 entering from a side of the bowl tangentially of the lowermost portion thereof. This nipple 28 has a passageway 32 extending therethrough and opening into the bowl 27.

In this modified form, milk entering the bowl 27 through the inlet nipple passageway 32 on substantially a line tangential with the lowermost portion of the bowl, therefore enters the bowl with the minimum possible amount of agitation and splash since the milk will be normally entering below the upper level of milk within the bowl. There is no tendency for the milk to swirl around and make rings of milk above the normal level in the bowl which quickly dry and are hard to remove in the washing of the bowl following the handling of the milk. Further, an advantage of this modified form 27 over the form 19 is that, for the same reason, the milk entering through the passageway 32 is coming in at the minimum level of accumulated milk in the bowl 27 whereas the milk entering through the passageway 18a of the bowl 19 may be entering as indicated in Fig. 1 above the level 24 causing deposits of milk between that level and the level of the nipple 18 to dry under intermittent flow of the milk. Thus, the modified form 27 gives a further check on the forming of milk stone as compared to the possibility in connection with the bowl 19. As is well known in the art, once the milk stone forms, it is rather difficult to remove particularly within an enclosed vessel.

While the foregoing description of the operation of the invention has been made in conjunction with the use of a structure for releasing milk from the bowls without destroying vacuum in the incoming line 17, the device may be used for other purposes, such as a vacuum milk lift, where the end of the line 17 is at a relatively low point, and milk coming into the bowls 19 or 27 is desirably elevated to a higher point. In that instance, the outlet nipple 20 in each case will be connected to the vacuum lift line instead of going into the releaser line 11. Also it is useful to employ the bowls 19 or 27 on a long milk line where air may accumulate at low levels, and therefore transfer that accumulated air to the upper part of the bowl to be withdrawn therefrom.

While I have herein shown and described my invention in the particular forms as illustrated, it is obvious that structural variations may be employed without departing from the spirit of the invention and I therefore do not desire to be limited to those precise forms beyond the limitations which may be imposed by the following claim.

I claim:

In a milking system, the combination with a constant vacuum pressure line and a milk flow line: of a spherical bowl; a passageway leading from the bowl through a milk discharge nipple extending radially and directed downwardly from the bottom of the bowl; a passageway leading into the bowl through a milk inlet nipple extending approximately tangential of the bottom of the bowl and located at the side of said discharge nipple; means interconnecting said inlet nipple with said milk flow line; a passageway leading from the bowl through a third nipple extending radially from said bowl approximately one hundred eighty degrees from said discharge nipple; means interconnecting said third nipple with said constant vacuum pressure line; the flow of milk from said milk line through said inlet nipple passageway being directed across the passageway of said discharge nipple, the level of accumulation of milk in said bowl being above said inlet nipple passageway.

References Cited in the file of this patent

UNITED STATES PATENTS 1,745,309    Norris    Jan. 28, 1930

FOREIGN PATENTS 3,971/26    Australia    June 28, 1927
9,246/27    Australia    Sept. 18, 1928